United States Patent Office 2,713,066
Patented July 12, 1955

2,713,066

BETA-CARBONYL-SUBSTITUTED UREIDES

David E. Adelson, Berkeley, Calif., assignor to Shell Development Company, Emeryville, Calif., a corporation of Delaware No Drawing. Application October 13, 1951,
Serial No. 251,240

16 Claims. (Cl. 260—482)

This invention relates to a new method of producing allophanyl-substituted compounds which have valuable properties and also deals with the novel products of this reaction.

The allophanyl-substituted compounds with which the invention is concerned are those having the allophanyl group

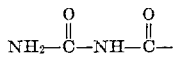

directly linked to a carbon atom. It has been found, unexpectedly, that compounds of this type can be produced advantageously by reacting biuret with organic compounds having a labile hydrogen atom attached to a carbon atom of the molecule. The reaction is carried out under conditions at which ammonia is split off and the corresponding allophanyl compound is produced.

There are a number of different labile hydrogen-containing compounds which may be used in the process successfully. The reaction of biuret with hydrocarbons having a labile hydrogen atom is claimed in my copending application Serial No. 93,629, filed May 16, 1949, now U. S. Patent 2,576,895, of which the present application is a continuation-in-part. The present application is also a continuation-in-part of copending application of Adelson and Larsen, Serial No. 46,558, filed August 27, 1948, now U. S. Patent 2,599,736.

Instead of the hydrocarbons, substitution products thereof having a labile hydrogen atom may be used provided the substituent or substituents are non-reactive under the conditions used. It has been found that substituents such, for instance, as the halogens, particularly fluorine and chlorine, nitro groups, ether, ester and keto groups, and the like are non-reactive under the conditions preferred for carrying out the new process and may be present in the starting labile hydrogen-containing compound without interfering with the desired formation of the allophanyl compound.

The sub-group of labile hydrogen-containing compounds, which are particularly useful starting materials for use in the process according to the present invention, is the carbonyl compounds having a hydrogen atom (the labile hydrogen) attached to a carbon atom directly linked to the carbonyl carbon atom. Included among these compounds are, for example, the carboxylic acids and their esters and the ketones having a labile hydrogen atom. Especially suitable are compounds of this type having two carbonyl groups which are linked together by a single carbon atom to which a hydrogen atom is attached since the labile hydrogen atom is particularly reactive with biuret in such cases. Typical compounds of this type are, for instance, the malonates including substituted malonates, especially mono-alkyl malonic acid esters, glutaconic acid and its esters, beta-ketonic carboxylic acids and their esters of which acetoacetic ester is typical, and the beta-diketones which may be aliphatic, alicyclic, aromatic or carbocyclic. In many cases these compounds also are substituted by alkali metals such as sodium or potassium at the labile hydrogen atom which may be either on a methylene or a saturated methenyl or methylidyne group. Instead of the dicarbonylic compounds, the somewhat less reactive corresponding monocarbonylic acids, esters and ketones may be similarly used. In all cases compounds having non-reactive substituents such as those previously discussed in connection with the labile hydrogen-containing hydrocarbons may be used successfully instead of the corresponding mono- or poly-carbonyl compounds.

The chosen labile hydrogen-containing reactant may be a pure or substantially pure chemical compound or a mixture of two or more such compounds or a mixture of one or a plurality of labile hydrogen-containing compounds with other compounds which do not interfere with the reaction. Also, it is frequently advantageous in the interest of economy to use the labile hydrogen-containing compound in the crude form in which it naturally occurs or is initially produced, or as incompletely refined products from such sources containing other components which do not interfere with the reaction of the invention.

The conditions under which the reaction of biuret with the chosen labile hydrogen-containing compound or compounds is carried out will depend upon the particular labile hydrogen-containing carbonyl compounds used. As a general rule, an elevated temperature of at least 100° C. is desirable and preferably temperatures of 110° C. to 250° C. are used, although higher temperatures up to the decomposition temperature of the product but preferably below 350° C. can be employed. The time of reaction will depend upon the temperature which is chosen and will be longer for lower temperatures than when temperatures nearer the upper limit of the permissible range are used. Also, longer times of reaction are desirable when using the less reactive labile hydrogen-containing compounds such as isoparaffin or mono-ketones than when employing compounds which form alkali metal substitution products such as fluorene, diethyl malonate, etc.

As a general rule, it is desirable to carry out the reaction under conditions at which the ammonia produced is removed substantially as fast as it is formed in the reaction. To this end, it is advantageous to operate at a subatmospheric pressure. Most preferably, however, pressures are used at which both reactants are maintained in the liquid. However, the use of conditions under which the labile hydrogen-containing carbonyl compound is volatilized is not excluded since, by passing the exit gases through a condenser or reflux column or by other suitable means, any unreacted labile hydrogen-containing carbonyl compound present in the effluent can be recovered and returned to the reaction. Such procedure is especially applicable in the case of highly volatile reactants such as acetone, for example. It is feasible in such, as well as other, cases to carry out the reaction in the gaseous state. Also, atmospheric or subatmospheric pressure may be used in both liquid and gas phase operations. As a general rule, however, it is preferred to operate in the liquid phase with pressures below 500 mm. Hg absolute, most preferably at pressures below 250 mm. Hg. Pressures of the order of about 1 to 20 mm. Hg have been found to be especially advantageous as products of superior quality and best color are usually obtained by operating in this range.

The ratio of the reactants which it will be most desirable to use will depend upon the particular labile hydrogen-containing carbonyl compound chosen for reaction but, as a general rule, a stoichiometric excess of biuret over that required for reaction with the labile hydrogen present in preferred. Usually a mole ratio of biuret to labile hydrogen-containing carbonyl compound of the order of 1.2:1 to 3:1 is preferred, although lower or higher ratios may be employed.

In some cases it is desirable to carry out the reaction in the presence of a mutual solvent for the biuret and labile hydrogen-containing carbonyl compound since intimate contact of the reactants can be facilitated in this way and better control of the reaction can be achieved. Suitable mutual solvents are those which are non-reactive under the chosen conditions. For labile hydrogen-containing carbonyl compounds which are soluble in hydrocarbons, solvents such as normal paraffins, e. g. hexane, heptane, octane, decane, cetane, etc., aromatics such as benzene, toluene and like compounds free from labile hydrogen atoms are useful.

The process may be carried out batchwise, intermittently or continuously, continuous operation being most advantageous for large scale manufacture. Any suitable form of equipment or apparatus may be used to carry out the reaction. It is desirable in many cases to provide means for agitating the contents of the reaction vessel by shaking, stirring, agitating with an inert gas, etc. As previously pointed out, where low boiling materials are used as reactants, it is desirable to fit the reaction vessel with a condenser or suitable reflux equipment to avoid loss of material. Suitable heating means may also be employed in order to maintain the reactants at the desired or optimum temperature. Although ammonia gas evolved may be vented to the atmosphere, it is often desirable to provide suitable apparatus for catching and recovering the ammonia gas emanating from the reaction mixture.

A number of different methods of working up the reaction product for recovery of the allophanyl compound produced are available. Thus, the product may be isolated and purified by distillation, extraction, fractionation, crystallization or any other suitable process. A preferred method for recovering the product is to cool the reaction mixture and then treat it with a solvent in which the allophanyl compound is soluble to the substantial exclusion of the other components of the mixture, especially of the biuret which may be present in excess of the theoretical amount required. Any solvent which preferentially dissolves the allophanyl compound and does not react with it may be used for the extraction. Suitable solvents are the hydrocarbon solvents, the alcohols, the ethers, the ketones, certain esters and the like. Toluene and the hot acid octane have been found to be especially suitable solvents to use for isolating and purifying the allophanyl compounds.

The process of the invention is illustrated by the following examples which also show some of the many valuable new compounds obtainable according to the invention.

EXAMPLE I

Biuret and diethyl malonate (molar ratio 1.5:1) are heated and stirred for 46 hours at 139° C.–142° C. and 95–145 mm. pressure. After extraction with n-butyl acetate, the product is isolated as a viscous, amber-colored liquid which is slightly soluble in western lubricating oil, SAE 20 grade, and which analyzes as follows:

|  | Found | Calculated For $NH_2CONHCOCH(COOC_2H_5)_2$ |
|---|---|---|
| Percent Nitrogen | 12.7 | 11.4 |
| n 20/D | *1.467(2) |  |
| Acid value equiv./ 100 g | 0.03(6) | 0 |

* The refractive index (n 20/D) of diethyl malonate is reported to be 1.4143.

Using methyl malonic acid dimethyl ester in place of the ethyl malonate under the same conditions gives alpha-allophanyl dimethyl methylmalonate:

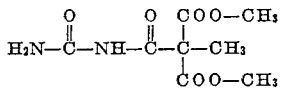

Other malonic esters are also suitable.

EXAMPLE II

Acetoacetic ethyl ester heated at 150° C. with 3 moles of biuret under a pressure of 350 mm. Hg for 43 hours gives a good yield of alpha-allophanyl acetoacetic acid ethyl ester

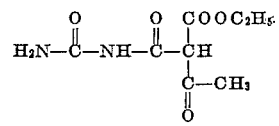

In the same way, biuret reacts with ethyl acetoacetic methyl ester to give alpha,alpha-allophanyl methyl acetoacetic methyl ester

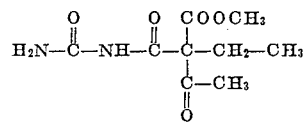

Acetylmalonic and ketosuccinic acid esters react in the same way under the same conditions. With ketoglutaric acid esters, however, diallophanyl derivatives are also formed unless a substantial molar excess of ester to biuret is used. Thus, from beta-ketoglutaric acid ester one can obtain alpha-allophanyl beta-ketoglutaric acid ester

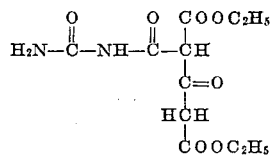

and/or alpha,gamma-diallophanyl beta-ketoglutaric acid ester

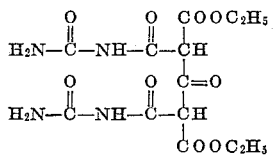

EXAMPLE III

A mixture of about 5 parts by weight of dibenzoyl methane and 7 parts of biuret of about 90% purity reacted for 23 hours at 140° C. to 145° C. while maintaining a pressure of 100 to 150 mm. Hg and taking off the evolved gases, mainly ammonia, through a sulfuric acid trap, gives a good yields of allophanyl dibenzoyl methane

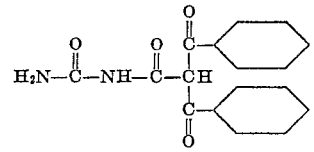

Under the same conditions 3-allophanyl-2,4-nonanedione

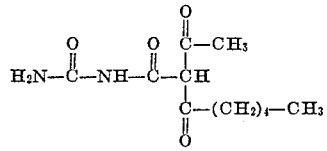

is obtained from acetyl caproyl methane, and allophanyl benzoyl acetyl methane

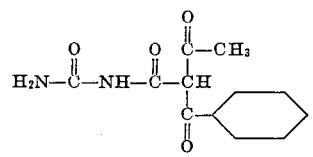

is obtained from benzoyl acetone.

EXAMPLE IV

Reacting a mixture of benzyl-propyl ketone and biuret in a mole ratio of 2.5:1 at 133° C. and 130 mm. Hg gives 4-allophanyl-4-phenyl-3-butanone

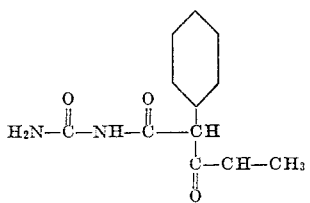

d-Carvone reacts similarly with biuret to produce allophanyl carvone

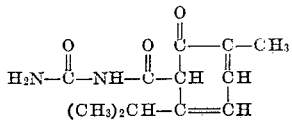

From these illustrative examples it will be seen that the process of the invention is applicable to a wide variety of different organic compounds having a carbonyl group linked directly to a carbon atom to which a labile hydrogen atom is directly attached. It will be understood, however, that the process is not limited to the compounds used by way of illustration in the examples since a great many other compounds are operative in the new reaction and produce valuable new products. Among such other useful starting materials are, for instance:

A. Ketones (1) ALIPHATIC (SATURATED AND UNSATURATED)

| | |
|---|---|
| Acetone | Isophorone |
| Butanone | Pentanediones |
| Hexanone | Mesityl oxide |
| Oleone | Diethyl ketone |
| Palmitone | 3-methyl-heptanone-2 |
| Methylethyl ketone | Diisobutyl ketone |
| Methylpropyl ketone | Ethyl glyoxal |
| Butyrone | Allyl acetone |
| Butenone | Diallyl acetone |
| Vinylethyl ketone | Dioleyl ketone |
| Pentanones | |

(2) AROMATIC

| | |
|---|---|
| Acetophenone | Benzyl phenyl ketone |
| Hydroxy-acetophenones | Dibenzoyl methane |
| Propiophenone | Dibenzoyl phenyl methane |
| Benzyl acetophenone | Benzoyl acetone |
| Dibenzyl ketone | Phenyl acetyl acetone |

B. Aldehydes (1) ALIPHATIC (SATURATED AND UNSATURATED)

| | |
|---|---|
| Acetaldehyde | Oleyl valeraldehyde |
| Propionaldehyde | Succinic dialdehyde |
| Butyraldehyde | Acrolein |
| Isobutyraldehyde | Glutaric dialdehyde |
| Caproaldehyde | Adipic dialdehyde |
| Valeraldehyde | Levulinic aldehyde |
| Crotonaldehyde | Alpha-chloroglutaconic dialdehyde |
| Citronellal | |

(2) AROMATIC

| | |
|---|---|
| Phenyl acetaldehyde | Diphenyl acetaldehyde |
| Phenyl methyl acetaldehyde | Benzyl acetaldehyde |
| Cinnamaldehyde | Tolyl acetaldehyde |
| p-Chlorophenyl acetaldehyde | |

C. Acids

| | |
|---|---|
| Acetic acid | Pimelic acid |
| Phenyl acetic acid | Azelic acid |
| Benzoyl acetic acid | Brassylic acid |
| Adipic acid | Phenyl malonic acid |
| Pyruvic acid | Ethyl glycolic acid |
| Propionyl acetic acid | Thiodiglycolic acid |
| Butyryl formic acid | Itaconic acid |
| Aceto butyric acid | Beta-chloropropionic acid |
| Levulinic acid | Chlorophenyl acetic acid |
| 12-keto stearic acid | Glutaconic acid |
| 13-keto behenic acid | Ethoxymalonic acid |
| Aldovaleric acid | Malic acid |
| Hexahydrobenzoic acid | Aspartic acid |
| 1,2-cyclohexanone carboxylic acid | |

D. Esters of carboxylic acids

Esters of any of the foregoing carboxylic acids with any of the following alcohols:

| | |
|---|---|
| Methyl alcohol | Methallyl alcohol |
| Ethyl alcohol | Crotyl alcohol |
| Propyl alcohol | 2-propyn-1-ol |
| Isopropyl alcohol | Oleyl alcohol |
| n-Butyl alcohol | Geraniol |
| Isobutyl alcohol | Citronellol |
| Secondary butyl alcohol | Linalool |
| Tertiary butyl alcohol | Diacetone alcohol |
| Amyl alcohol | Ethylene glycol monoethyl ether |
| Hexyl alcohol | |
| Octyl alcohol | Cyclohexanol |
| Decyl alcohol | Naphthenic alcohols |
| Lauryl alcohol | Benzyl alcohol |
| Myristyl alcohol | Tolyl alcohol |
| Cetyl alcohol | Phenyl ethyl alcohol |
| Stearyl alcohol | Octadecylbenzyl alcohol |
| Allyl alcohol | |

Some of the specific esters which are operative in the process are:

| | |
|---|---|
| Allyl acetate | Dimethyl sebacate |
| Allyl propionate | Ethyl isobutyrate |
| Allyl laurate | Dibutyl tartronate ethyl ether |
| Allyl capronate | |
| Allyl isovalerate | Dimethyl suberate |
| Allyl stearate | Dimethyl azelate |
| Ethyl propionylacetate | Dioctyl sebacate |
| Methyl acetobutyrate | Dioctyl succinate |
| Methyl benzoylacetate | Allyl methallyloxyacetate |
| Allyl alloxyacetic acid | Glyceryl ricinoleate |
| Methyl ricinoleate | Glyceryl oleate |
| Di-sec-butyl diglycolate | Allyl succinate |
| Triethyl methoxy citrate | Sorbitan oleate |

Naturally occurring esters such as:

| | |
|---|---|
| Castor oil | Neat's-foot oil |
| Cocoanut oil | Palm oil |
| Corn oil | Peanut oil |
| Cottonseed oil | Carnauba wax |
| Horse fat | Spermaceti |
| Lard oil | Beeswax |
| Wool fat | Rapeseed oil |
| Japan wax | Soya bean oil |
| Mutton tallow | Whale oil |
| Beef tallow | Sperm oil |

The products of the invention have many valuable properties which make them useful in a variety of industrially important applications. Those which are oil-soluble are, as a class, very valuable lubricating oil additives, as described in more detail and claimed in copending application of Adelson and Larsen, Serial No. 46,558, filed August 27, 1948, previously referred to. The new compounds are also useful antioxidants for natural and synthetic rubbers and other organic materials which are subject to oxidative deterioration, particularly fats and oils. Relatively small amounts are effective in retarding oxidation and, generally, it is not necessary to use more than 5% by weight of the allophanyl compound, and preferably about 0.1% to 2% by weight when applying the new compounds as antioxidants.

The products having 10 or more carbon atoms in a chain, such as alpha-allophanyl acetoacetic acid octadecyl ester and the like, have detergent and wetting properties and may be used in cleaning compositions, as textile treating agents, and in the preparation of emulsions and the like.

The allophanyl derivatives of ketones and esters are useful plasticizers and softeners for the artificial and natural resins with which they are compatible. The products from the unsaturated esters, for instance, alpha-allophanyl diallyl or divinyl malonates, are capable of polymerization to useful resins, the copolymers with other polymerizable compounds such as vinyl chloride, vinyl acetate, diallyl phthalate, styrene, etc. being especially advantageous, particularly when the allophanyl ester represents about 25% to 75% by weight of the starting mixture of monomers.

The allophanyl ketone compounds of the invention, such as 3-allophanyl-2-butanone, 1-allophanyl-2-propanone, 2-allophanylcyclohexanone, etc., undergo condensation with other ketones, for example, acetone, methyl ethyl ketone, mesityl oxide and the like, to produce resinous products varying from viscous liquids to hard, clear solids. The allophanyl derivatives of dicarboxylic acids, for instance, alpha-allophanyl malonic acid and the like, are useful starting materials for the preparation of alkyd resins by reaction with polyhydroxy alcohols such as glycerine, ethylene glycol, polyvinyl alcohol, etc.

By reaction with alcohols, whether mono- or polyhydroxy, at temperatures of the order of 50° C. to 200° C., preferably under reduced pressure, the terminal amine group of the new compounds is split off as ammonia and is substituted by the oxy radical of the alcohol used, forming an ester linkage. Still other reactions may be carried out with the new compounds of the invention which will thus be seen to offer many advantages in widely different applications. It will therefore be clear that the invention is not limited to the examples which are merely given as illustrative of the diverse compounds and their uses made possible by the invention.

I claim as my invention:

1. A process of producing a member of the group consisting of allophanyl-substituted ketones and carboxylic acid esters which comprises reacting biuret with a member of the group consisting of monoketones and diketones and monocarboxylic acid esters and dicarboxylic acid esters composed exclusively of carbon, hydrogen and oxygen chosen from the group consisting of ester and keto oxygen atoms, having a total of not more than 57 carbon atoms in the molecule and having a labile hydrogen atom attached to a carbon atom which is directly linked to a carbonyl carbon atom at a temperature of about 50° C. to about 350° C. whereby ammonia is formed and an allophanyl group is substituted for said labile hydrogen atom on said carbon atom.

2. A process in accordance with claim 1 wherein the said labile hydrogen atom is attached to a carbon atom to which two carbonyl carbon atoms are also directly linked and the reaction is carried out at between about 100° C. and 250° C. using a molar excess of biuret.

3. A process of producing an allophanyl-substituted ester of a dicarboxylic acid which comprises heating an ester of a dicarboxylic acid containing no other atoms than carbon, hydrogen and carbonyl and ester-oxygen atoms and having a hydrogen atom directly attached to a carbon atom to which the two carboxyl carbon atoms of the acid are also directly attached, the hydrocarbon radicals of which ester each contain not more than 18 carbon atoms, with a molar excess of biuret at a temperature of 100° C. to 250° C. whereby ammonia is formed and an allophanyl group is substituted for hydrogen on said carbon atom.

4. A process of producing an allophanyl-substituted alkyl ester of a malonic acid which comprises heating at 50° C. to 250° C. an alkyl ester of a malonic acid having not more than 18 carbon atoms per alkyl group and containing no other atoms than carbon, hydrogen and carbonyl and ester-oxygen atoms and having a hydrogen atom directly attached to the carbon atom to which the two carboxyl carbon atoms of said acid are also directly attached with a molar excess of biuret and an allophanyl group is substituted for hydrogen on said carbon atoms, and removing the ammonia produced substantially as fast as it is formed.

5. A process which comprises heating at a temperature of 100° C. to 250° C. and a subatmospheric pressure diethyl malonate with a molar excess of biuret.

6. A process of producing an allophanyl-substituted keto-hydrocarbon which comprises heating at 50° C. to 250° C. a keto-hydrocarbon having directly attached to a carbonyl carbon atom a saturated carbon atom to which a hydrogen atom is directly linked, the hydrocarbon radicals joined to carbonyl carbon each containing not more than 18 carbon atoms, with biuret whereby ammonia is formed and an allophanyl group is substituted for hydrogen on said carbon atom.

7. A process of producing an allophanyl-substituted diketo-hydrocarbon which comprises heating a diketo-substituted hydrocarbon having a hydrogen atom directly attached to a carbon atom to which two carbonyl carbon atoms are also directly attached, the hydrocarbon radicals joined to carbonyl carbon each containing not more than 18 carbon atoms, with a molar excess of biuret at a temperature of 100° C. to 250° C. whereby ammonia is formed and an allophanyl group is substituted for hydrogen on said carbon atom.

8. A process of producing allophanyl dibenzoyl methane which comprises heating at 100° C. to 250° C. and under subatmospheric pressure dibenzoyl methane with a molar excess of biuret.

9. An allophanyl-substituted ketone of the formula

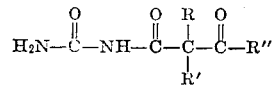

wherein R represents a member of the group consisting of hydrogen and hydrocarbon radicals, R' represents a member of the group consisting of hydrogen, hydrocarbon and

radicals in which R'' is a hydrocarbon radical and R' and R'' can together form a divalent hydrocarbon radical, said hydrocarbon radicals each containing not more than 18 carbon atoms.

10. Alpha-allophanyl-substituted keto-hydrocarbon wherein the allophanyl group is directly linked to a carbon atom which is directly attached to a carbonyl carbon atom and the hydrocarbon radicals each contain not more than 18 carbon atoms.

11. Alpha-allophanyl beta-diketone hydrocarbon wherein the allophanyl group is directy linked to the carbon atom to which the two ketone carbonyl carbon atoms are directly attached and the hydrocarbon radicals each contain not more than 18 carbon atoms.

12. Unsubstituted 3-allophanyl-2,4-alkanedione wherein the alkane radicals contain not more than 18 carbon atoms.

13. Allophanyl dibenzoyl methane of the formula

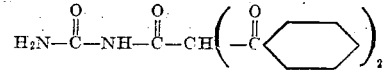

14. Allophanyl-substituted dicarboxylic acid ester of the formula

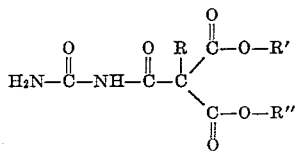

wherein R represents a member of the group consisting of the hydrogen atom and hydrocarbon radicals, and R' and R" represent hydrocarbon radicals, said hydrocarbon radicals containing not more than 18 carbon atoms each.

15. Allophanyl ester of the formula

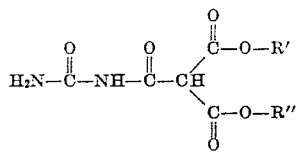

wherein R' and R" represent aliphatic hydrocarbon radicals, each containing not more than 18 carbon atoms.

16. Alpha-allophanyl dialkyl malonate wherein the alkyl groups contain not more than 18 carbon atoms.

References Cited in the file of this patent

UNITED STATES PATENTS

| 893,308 | Conrad | July 14, 1908 |
| 2,304,369 | Morgan et al. | Dec. 8, 1942 |
| 2,362,768 | Morgan et al. | Nov. 14, 1944 |
| 2,379,486 | Hill et al. | July 3, 1945 |
| 2,400,394 | De Groote et al. | May 14, 1946 |
| 2,473,577 | De Groote et al. | June 21, 1949 |

FOREIGN PATENTS

| 144,431 | Germany | Sept. 14, 1903 |
| 283,105 | Germany | Mar. 30, 1915 |

OTHER REFERENCES

Chemical Abstracts, vol. 5 (1911), p. 2641.
Beilstein: "Handbuch der Organischen Chemie," vol. III, 1st supplement (1929), p. 33.